(12) United States Patent
Numao et al.

(10) Patent No.: US 7,346,171 B2
(45) Date of Patent: Mar. 18, 2008

(54) NETWORK SYSTEM, TERMINAL, AND METHOD FOR ENCRYPTION AND DECRYPTION

(75) Inventors: Masayuki Numao, Kawasaki (JP); Yuji Watanabe, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 802 days.

(21) Appl. No.: 10/271,809

(22) Filed: Oct. 15, 2002

(65) Prior Publication Data

US 2003/0081789 A1    May 1, 2003

(30) Foreign Application Priority Data

Oct. 19, 2001    (JP)    .............................. 2001-322742

(51) Int. Cl.
*H04L 9/00*    (2006.01)
(52) U.S. Cl. ...................... 380/286; 713/163; 713/169; 380/286
(58) Field of Classification Search ................ 380/286; 713/163, 169
See application file for complete search history.

(56) References Cited

U.S. PATENT DOCUMENTS

| | | | |
|---|---|---|---|
| 5,475,757 A * | 12/1995 | Kelly | 713/159 |
| 5,768,391 A * | 6/1998 | Ichikawa | 713/153 |
| 5,956,407 A * | 9/1999 | Slavin | 380/30 |
| 6,240,188 B1 * | 5/2001 | Dondeti et al. | 380/284 |
| 6,263,435 B1 * | 7/2001 | Dondeti et al. | 713/163 |
| 6,295,361 B1 * | 9/2001 | Kadansky et al. | 380/278 |
| 6,820,204 B1 * | 11/2004 | Desai et al. | 726/6 |
| 6,834,310 B2 * | 12/2004 | Munger et al. | 709/232 |
| 6,972,864 B2 * | 12/2005 | Lapstun et al. | 358/1.15 |
| 2001/0023487 A1 * | 9/2001 | Kawamoto | 713/202 |

FOREIGN PATENT DOCUMENTS

| | | |
|---|---|---|
| JP | 10-260903 | 9/1998 |
| JP | 2000-151573 | 5/2000 |

* cited by examiner

*Primary Examiner*—Nasser Moazzami
*Assistant Examiner*—Mohammad Reza
(74) *Attorney, Agent, or Firm*—Louis P. Herzberg

(57) ABSTRACT

Provides encryption methods, and systems and apparatus corresponding decryption method systems and apparatus in which terminals belonging to a subset selected as a recipient group can collaborate to decrypt encrypted information. In an example embodiment, a sender and recipients communicate information over a network. The sender sends information encrypted by using a group key that can be decrypted by collaboration among a given number of recipients to the recipients in a predetermined recipient group. On the other hand, the recipients receive encrypted data from the sender, exchange partial information concerning the encrypted data among a plurality of recipients in the recipient group to obtain decryption information used for decrypting the encrypted data, and decrypt the sent information by using the decryption information.

2 Claims, 14 Drawing Sheets

NETWORK SYSTEM, TERMINAL, AND METHOD FOR ENCRYPTION AND DECRYPTION

FIELD OF THE INVENTION

The present invention relates to an encryption and decryption method for multicasting information. The information is encrypted in such a manner that the encrypted information can be decrypted only by terminals belonging to a subset selected as a recipient group from among terminals on a network.

BACKGROUND ART

There is a network data delivery technology called multicasting that delivers the same data to a number of specified destinations. Today, network environments, typified by the Internet, are widely used and therefore multicasting may require encryption of data before sending. For example, a certain subset of terminals on a network may be specified as a recipient group and data may be encrypted and delivered in such a manner that only the terminals in that recipient group can decrypt it.

Various encryption technologies have been proposed, including one in which a predetermined dealer centrally manages decryption keys, one in which each terminal generates and manages a public key and secret key of a public key cryptosystem, and one in which recipient groups capable of decrypting encrypted data can be dynamically changed. A typical prior-art technology is broadcast encryption described in a document entitled "Broadcast Encryption" (Crypto 93, LNCS, 1993; by Fiat, A. and Naor, M.).

In the Broadcast Encryption, a method is proposed for constructing an encryption key that can only be decrypted by members of a recipient group, which is a given subset of a given user group. In particular, in the proposed method, a threshold for the size of coalition among users is set and a group secret key that can resist coalition up to that size (a group key that cannot be cracked unless that number of users coalesce) is generated. Encrypted data can be decrypted by any single member of the recipient group.

Prior-art encryption technologies of this type, including the above described Broadcast Encryption, in general allow a single terminal belonging to a recipient group to decrypt encrypted data.

Multicasting as described above is required not only in a client-server model in which mostly a server on a network delivers information (contents) to clients but also in a peer-to-peer model which provides the capability of exchanging information between terminals. For example, multicasting may be used when information is exchanged between terminals in a certain group formed on a network. It would be advantageous to have an encryption technology for implementing secure multicasting in such an environment in which encrypted data can be decrypted only by a coalition of all or some of terminals that belong to a group. Known encryption technologies that aim to prevent decryption of encrypted data by a coalition of terminals, as assumed by prior-art technologies such as the broadcast encryption, can be applied to the above described environment.

SUMMARY OF THE INVENTION

Thus, an aspect of the present invention is to provide an encryption method and a decryption method in which terminals in a subset selected as a recipient group can collaborate to decrypt encrypted data.

Another aspect of the present invention is to provide secure multicasting data delivery by using the encryption and decryption methods.

BRIEF DESCRIPTION OF THE DRAWINGS

These and other aspects, features, and advantages of the present invention will become apparent upon further consideration of the following detailed description of the invention when read in conjunction with the drawing figures, in which.

Figure 1:
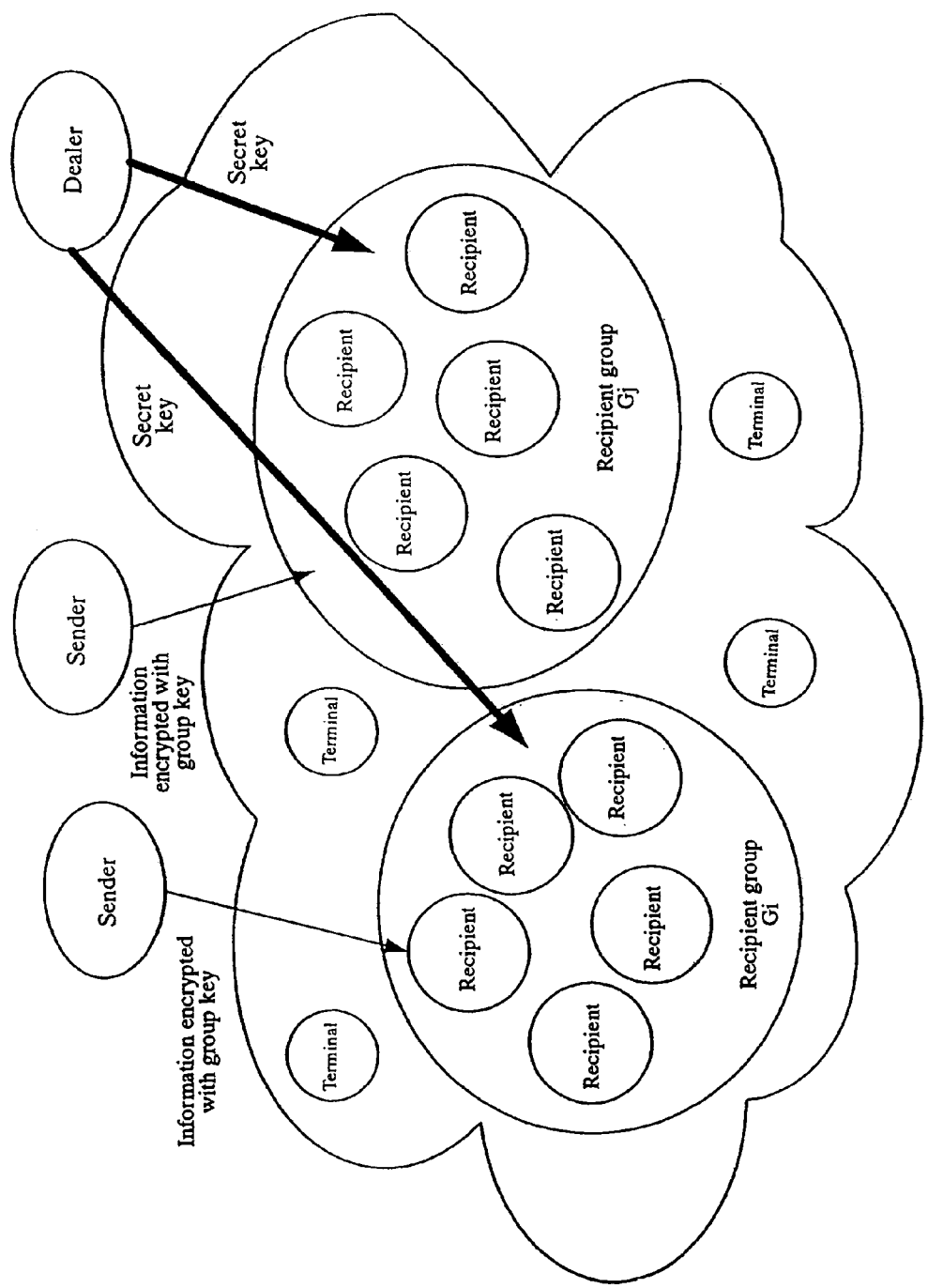
FIG. 1 shows relationships among senders, recipients, and a dealer according to a first embodiment of the present invention.

DESCRIPTION OF SYMBOLS 4210 and 410 . . . Sender terminal
211 . . . Data storage
212 . . . Group key requesting module
213 . . . Encryption module
220 and 420 . . . Recipient terminal
221 . . . Decryption module
222 . . . Data storage
230 . . . Dealer
231 . . . Key generation module
411 . . . Data storage 412 . . . Public key database
413 . . . Group public key generation module
414 . . . Encryption module
421 . . . Key generation module
422 . . . Decryption module
423 . . . Data storage

DESCRIPTION OF THE INVENTION

The present invention achieves these aspects with methods, apparatus and systems as described herein. The present invention can be implemented as a network system configured as described below. The system comprises sender terminals and recipient terminals that send and receive information over a network. The sender terminal encrypts information by using a group key derived from a set of ID information of a given number of recipient terminals and sends the encrypted information to the recipient terminals. The recipient terminals receive the encrypted data from the sender terminal and exchange partial information that is unique to each recipient terminal and used for decrypting the encrypted data with a plurality of recipient terminals to obtain decryption information for decrypting the encrypted data and decrypt the delivered information by using the decryption information.

The terms "sender terminal" and "recipient terminal" do not necessarily refer to specific hardware (terminals). They refer to sending and receiving ends in a system. In other words, a terminal used by a user who is a sender is a sender terminal and a terminal used by a user who is a recipient is a recipient terminal.

The ID information includes an ID assigned to a terminal or its user (recipient), a secret key, public key, and the like. The partial information herein may be a secret key of each recipient terminal. If a public key cryptosystem is used, decryption information (partial decryption information) produced by processing encrypted data with a secret key may be used as the partial information to avoid exchanging the secret key itself.

Decryption information varies depending on partial information used. If partial information is a secret key, a group key used for encrypting sent information may be recovered based on the secret key and the recovered group key may be used as decryption information. On the other hand, if partial information is partial decryption information as described above, a public key cryptosystem is used instead of exchanging a secret key itself. Therefore, no decryption key corresponding to a group key can be generated. However, double encryption can be used in which a predetermined session key is used to encrypt information to deliver and a group key is used to encrypt the session key, and in addition, a cryptosystem in a finite field (for example ElGamal cryptosystem) can be used to encrypt the session key to calculate information from a set of partial decryption information, which can be used as decryption information to recover the session key. The key that corresponds to the group key and is used for decryption is kept hidden during the process of decrypting the delivered information.

The sender terminal sets a threshold indicating the number of recipient terminals required to collaborate to decrypt encrypted information and sends the threshold to the recipient terminals along with the delivered, encrypted information. A number of recipient terminals equal to the threshold exchange information about encrypted data to obtain information about a group key. In this configuration, a subset (recipient group) of recipient terminals that are destinations of information can cooperate to decrypt encrypted data.

The present invention can also be implemented as a client-server network system comprising a sender terminal for encrypting information by using a first key and sending the encrypted information over a network; recipient terminals for receiving encrypted data sent from the sender terminal and decrypting the sent information by using second keys; and a dealer for delivering the second key unique to each of the recipient terminals to each recipient terminal and delivering the first key to the sender terminal, the first key being used for encryption that can be decrypted by using a plurality of the second keys.

The dealer can generate the second key based on the ID information of the recipient terminals, construct a polynomial passing through points having a value of the second key, and deliver a constant term of the polynomial as the first key to the sender terminal and recipient terminals. The sender terminal can determine a recipient group and request the dealer to send the first key decryptable by using the second key in the recipient terminals in the recipient group.

The present invention can also be implemented as a peer-to-peer network system comprising a sender terminal and recipient terminal communicating information over a network, wherein: the sender terminal comprises: an encryption module for encrypting information by using a predetermined session key and encrypting the session key based on a group key produced by using public keys of a given number of recipient terminals to which the information is to be sent; and a communication module for sending the session key encrypted by the encryption module and the information encrypted by using the session key to the recipient terminals to which the information is to be sent, and each of the recipient terminals comprises: a communication module for receiving encrypted data sent from the sender terminal and sending and receiving data to and from the other recipient terminals; a key generation module for generating a secret key of that recipient terminal and a public key based on the secret key; and a decryption module for processing the encrypted session key by using the secret key to obtain partial decryption information, exchanging the partial decryption information with a plurality of the recipient terminals to obtain decryption information used for decrypting the session key, decrypting the session key by using the obtained decryption information, and decrypting the sent information by using the decrypted session key.

The encryption module of the sender terminal constructs a polynomial passing through points having a value of the public key of each recipient terminal to which the information is to be sent and uses the group key as a constant term of the polynomial. The encryption module of the sender terminal encrypts the session key by using the group key and a cryptosystem in a finite field.

The encryption method in the network system according to the present invention can be applied to a system for providing specific services as described below, for example. The present invention can be implemented as a conference system comprising a subject provider terminal for providing a subject to be discussed and participant terminals for obtaining the subject provided from the subject provider over a network and making a decision about the subject. Also, the present invention can be implemented as a metering system comprising content user terminal for obtaining a content over a network and using the content and a metering server for monitoring obtainment of the content by the content user terminals, or a metering system comprising a content provider terminal for providing a content over a network and a metering server for monitoring obtainment of the content by a predetermined terminal. The present invention can also be implemented as a secret distribution system comprising a secret holder terminal for providing secret information and a plurality of secret distribution target terminals for obtaining the secret information from the secret holder terminal over a network and holding the information in a distributed manner.

Also, the present invention can be implemented as a terminal for delivering information over a network. The terminal comprises a recipient group determination module for determining a recipient group including a given number of recipient terminals to which information is to be sent; an encryption module for using a group key produced based on a set of the ID information of the recipient terminals in the recipient group to encrypt information to be sent in a manner that the encrypted information can be decrypted by information exchange among a predetermined number of recipient terminals in the recipient terminals in the recipient group; and a transmission module for sending encrypted information to a recipient terminal over the network.

If a system in which the above described terminal delivers information includes a dealer (server) for managing ID information of recipient terminals, the recipient terminals can request the dealer to generate a group key and obtain the key from the dealer. If a system includes no such dealer and a public key for encryption and a secret key for decryption are set in recipient terminals in a recipient group, the terminal itself that delivers information may use a public key, which is ID information, to generate a group key. To encrypt information, first a predetermined session key may be used to encrypt information to be sent, then a group key may be used to encrypt the session key. The session key may be encrypted by using a cryptosystem in a finite field. The cryptosystem in a finite field may be ElGamal, for example.

The present invention may be implemented as a terminal for receiving information sent over a network. The terminal comprises a communication module for sending and receiving data over the network; and a decryption module for obtaining from received encrypted data a threshold indicating the number of terminals required to collaborate to decrypt the encrypted data, exchanging partial information with a number of other terminals equal to the threshold through the communication module, the partial information being unique to each of the terminals and used for decrypting the encrypted data, obtaining decryption information for decrypting the encrypted data from the partial information provided from the terminals through the information exchange, and using the decryption information to decrypt the encrypted data.

The decryption module processes said encrypted data by using a secret key of the terminal to obtain the partial information and exchanges the partial information with the other terminals. It then obtains the decryption information from the partial information obtained through the information exchange. The decryption module references a list being attached to said received encrypted data and containing terminals to which the encrypted data is to be sent, and exchanges the partial information with the terminals on the list.

Furthermore, the present invention can be implemented as an encryption method comprising the steps of: determining a recipient group including a given number of recipients to which information is to be sent; generating a group key based on the ID information of the recipients in the recipient group; and encrypting the information by using the generated group key in a manner that the encrypted information can be decrypted by information exchange by a predetermined number of recipients in the recipients in the recipient group.

The step, of generating the group key comprises the steps of: constructing a polynomial passing through points having a value of the ID information of the recipients and using the group key as a constant term of the polynomial. The step of generating said group key may comprise the steps of: setting virtual points overlapping no ID information of the recipients and adding information about the virtual points to the group key. The step of encrypting information comprises the step of performing encryption by using a group key and a cryptosystem in a finite field.

The present invention can be implemented as a decryption method comprising the steps of: obtaining from encrypted data received over a network a threshold indicating the number of terminals required to collaborate to decrypt encrypted information; exchanging partial information among a number of terminals equal to the threshold, the partial information being unique to each of the terminals and being used for decrypting the encrypted data; and obtaining decryption information for decrypting the encrypted data from the partial information obtained from each of the terminals through the information exchange, and decrypting the encrypted data based on the decryption information.

The present invention can be implemented as a program for causing a computer to function as the terminal described above and to perform the encryption method or decryption method described above. The program can be provided by storing and delivering it on a magnetic disk, optical disk, semiconductor memory, or other recording media, or delivering it over a network.

The present invention will be described below in detail with respect to embodiments shown in the accompanying drawings. The present invention provides an encryption technology that selects a given subset of a plurality of terminals on a network as a recipient group and enables encrypted data to be decrypted by a coalition of all or some of the terminals in the recipient group.

According to the present invention, an encryption method is provided in which polynomial interpolation is used to construct a polynomial that passes through a point having the value of ID information (secret key) of a terminal in the recipient group or its user and a secret key is used as a constant term to enable encrypted data to be decrypted by a coalition of a plurality of recipient terminals in (members of) that recipient group. In this encryption method, a threshold, which will be described later, is used to enable encrypted data to be decrypted even if some of the members of the recipient group are missing. The encryption method can be applied to a discrete-logarithm-based public key cipher to allow a secret key of each terminal (user) to be used any number of times. In addition, the need for a server delivering secret keys can be eliminated from an information delivery system using this encryption.

First Embodiment

As a first embodiment, an information delivery system will be described in which a key issued by a dealer is used to encrypt and decrypt information. For the purpose of the description, three participants will be first defined as follows. FIG. 1 shows relationships among the three participants.

A sender: selects subsets, recipient groups Gi and Gj, of terminals and uses group keys for the recipient groups Gi and Gj to encrypt information and sends it.

Recipient: receives the encrypted information and decrypts it using a secret key.

Dealer: generates and delivers a secret key for recipients. Typically, it is operated by a trusted third party organization (TTP: Trusted Third Party) because the dealer knows the secret keys of the recipients. It can also generate group keys.

Figure 2:
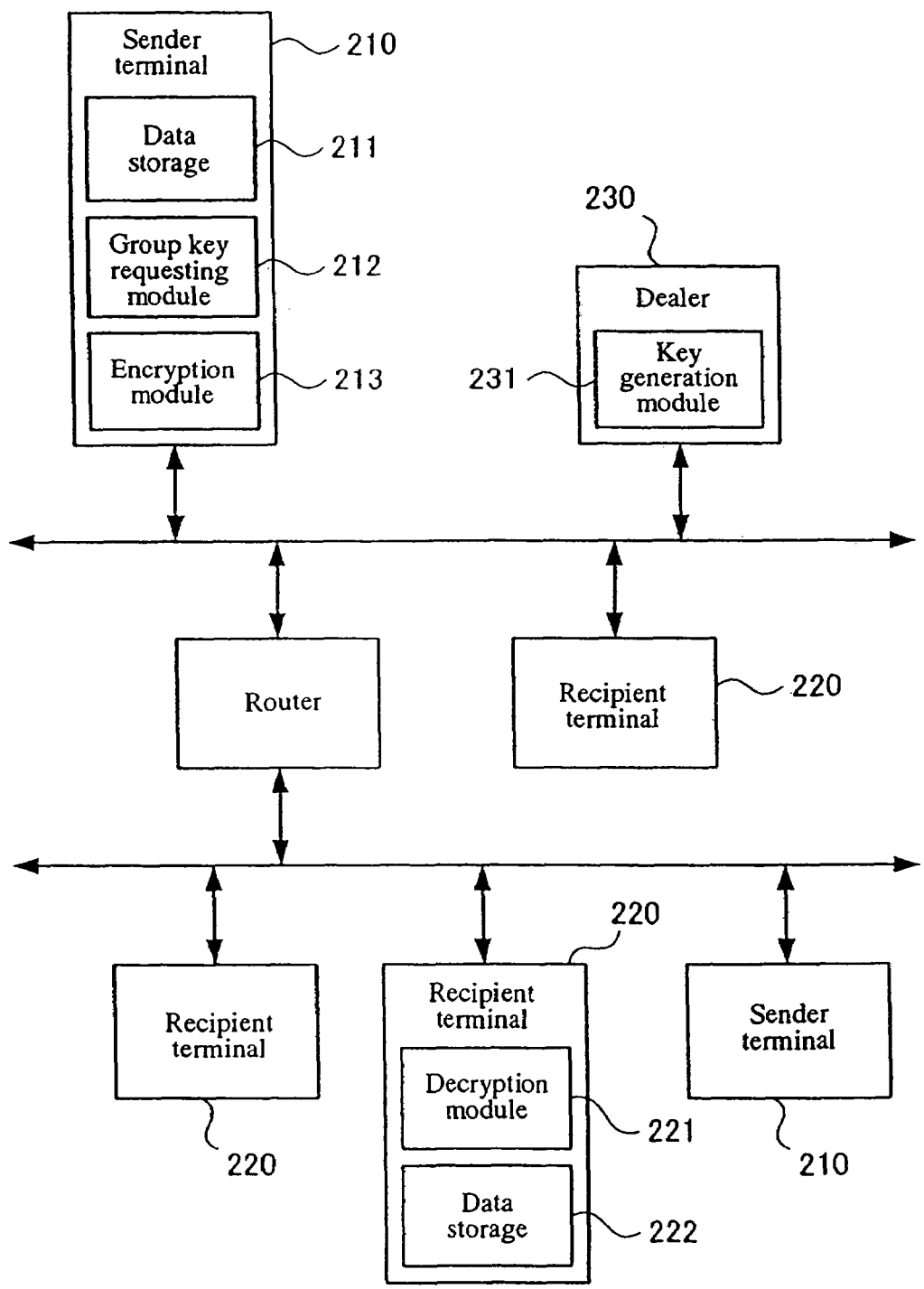
FIG. 2 shows an example of a system configuration of an information delivery system for implementing the first embodiment.

FIG. 2 shows a configuration of an information delivery system for implementing the first embodiment. Referring to FIG. 2, the information delivery system of the present invention is a network system comprising sender terminals 210 used by senders, recipient terminals 220 used by recipients, and a dealer 230, which is a server for managing these terminals and generating and delivering keys used for encryption and decryption.

The sender terminal 210 and recipient terminals 220 may be implemented by personal computers, workstations, or other computer devices, or PDAs (Personal Digital Assistants) or cellular phones having network capability. The dealer 230 may be implemented by a computer such as a personal computer or workstation. As described earlier, the sender terminals 210 and recipient terminals 220 mean sending and receiving parties in given information delivery. Any terminal interconnected over the network can be a sender terminal 210 or recipient terminal 220.

The dealer 230 manages all the terminals (registered as members of the information delivery system according to the present embodiment) that can be destinations of information among terminals connected to it over the network. When the dealer 230 delivers information, it selects as a recipient group a given subset from among the terminals it manages and sends the information to that recipient group. That is, among the terminals managed by the dealer 230, recipient terminals included in the subset selected as the recipient group by the sender terminal 210 become recipient terminals 220. The recipient group may be constituted by all the terminals managed by the dealer 230, at the maximum.

As shown in FIG. 2, the sender terminal 210 includes a data storage 211 for storing information to deliver to recipient terminals 220, a group key requesting module 212 for requesting the dealer 230 to issue a group key, and an encryption module 213 for encrypting the information stored in the data storage 211 by using the group key sent from the dealer 230. The data storage 211 may be memory such as RAM. The group key requesting module 212 and encryption module 213 may be implemented by a CPU under the control of a program. The program may be provided by storing and delivering it on a magnetic disk, optical disk, semiconductor memory, or other recording media, or delivering it over a network. The sender terminal 210 performs data communication with the recipient terminals 220 and dealer 230 over the network through a communication controller and a network interface, which are not shown. While the configuration of only one sender terminal 210 is shown in FIG. 2, the other terminal 210 in FIG. 2 of course has a similar configuration.

The group key requesting module 212 selects from the universal set of terminals managed by the dealer 230 a subset of terminals to which information is to be sent as a recipient group. Then, it sends a set of IDs of the recipient terminals 220 constituting the recipient group to the dealer 230 to request it to issue a group key for the recipient group.

The recipient terminals 220 include a decryption module 221 that uses a secret key sent from the dealer 230 to decrypt information sent from the sender terminal 210 and a data storage 222 for storing the decrypted information. The decryption module 221 is a CPU controlled by a program. The data storage 222 may be implemented by memory such as RAM. The program controlling the CPU may be provided by storing and delivering it on a magnetic disk, optical disk, semiconductor memory, or other recording media, or delivering it over a network. The recipient terminals 220 perform data communication with the sender terminal 210 and dealer 230 over the network through a communication controller and a network interface, which are not shown. The recipient terminals 220 can output decrypted information to an output device such as a display device or audio output device, which are not shown, besides storing it in the data storage 222. While the configuration of only one recipient terminal 220 is shown in FIG. 2, the other terminals 220 in FIG. 2 of course have a similar configuration.

The dealer 230 includes a key generation module 231 that generates a group key for encrypting information in the sender terminal 210 and a secret key for decrypting the encrypted information in recipient terminals 220. The key generation module 231 may be implemented by a CPU controlled by a program. The program may be provided by storing and delivering it on a magnetic disk, optical disk, semiconductor memory, or other recording media, or delivering it over a network. The dealer 230 performs data communication with the sender terminal 210 and recipient terminals 220 over the network through a communication controller and a network interface, which are not shown.

The key generation module 231 includes a random number generator and uses random numbers generated by it to generate a secret key for each terminal. The generated secret key is sent to each terminal over a secret channel. The key generation module 231, in response to the sender terminal 210, uses a set of IDs of the recipient terminals 220 constituting a recipient group to generate a group key for that recipient group and send it to the sender terminal 210.

Figure 3:
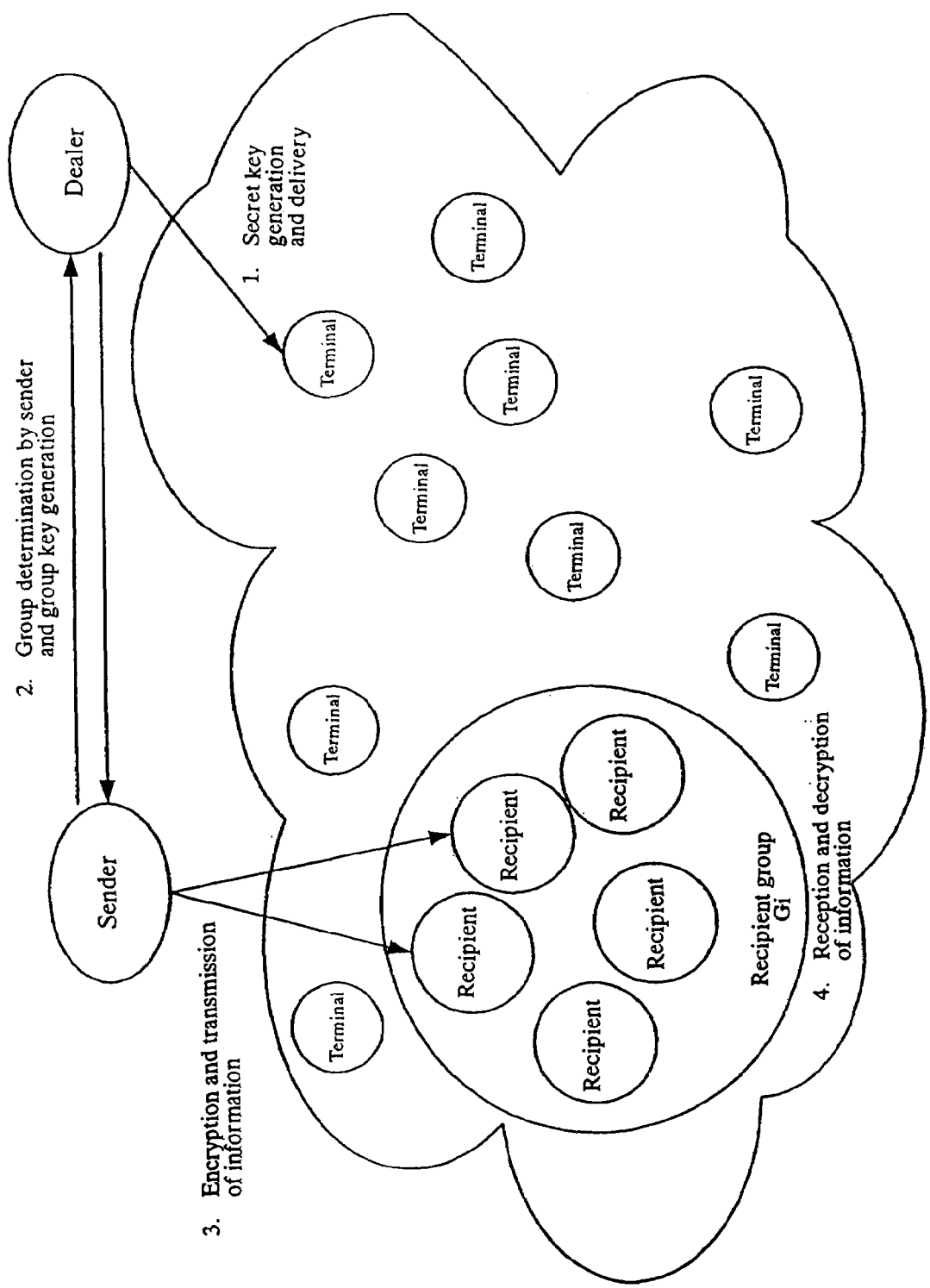
FIG. 3 shows an example of a process for delivering information in the information delivery system according to the first embodiment.

FIG. 3 illustrates an information delivery process performed in the information delivery system of the present embodiment as described above. Referring to FIG. 3, information delivery according to the present embodiment includes of four main phases: 1. Secret key generation and delivery, 2. Group determination by sender and group key generation, 3. Encryption and transmission of information, and 4. Reception and decryption of information. Each of these phases will be detailed below.

In the following description, p represents a large prime number, q represents a prime number that can divide p−1 without a remainder, and g represents an element of an order q in a finite field Zp.

1. Secret Key Generation and Delivery

The dealer 230 uses the key generation module 231 to generate a secret key $s_i$ for terminals $s_i$ (where i=1, . . . , N) of N users who access the network and sends it to the terminal of each user over a typical, secret channel. Here, the ID of the terminal $s_i$ is represented by i.

2. Group Determination by Sender and Group Key Generation

The sender terminal 210 selects terminals to which information is sent from the universal set of terminals managed by the dealer 230 as a recipient group GU={$S_{g1}$, . . . , $S_{gm}$}. A set of IDs of the recipient terminals 220 constituting the recipient group GU is represented by G={$g_1$, . . . , $g_m$}. The number of members of the recipient group GU, that is, the recipient terminals 220 in the recipient group GU, is m. A threshold k, which specifies the minimum number of members that collaborate to decrypt encrypted data, is determined. The set G of IDs in the recipient group GU and threshold k are temporarily stored in the data storage 211. Then, the group key requesting module 212 reads the ID set G and threshold k from the data storage 211 and sends them to the dealer 230 to request it to issue a group key $s_G$ for the recipient group GU.

In response to the request from the sender terminal 210, the dealer 230 generates a group key $s_G$ for the recipient group GU by using the key generation module 231 and sends it to the sender terminal 210. Generation of the group key $s_G$ will be further described below.

The key generation module 231 in the dealer 230 first constructs a polynomial f(x) of an order m−1 as expressed by the following equation:

$$f(X) = \sum_{i \in G} \lambda_i(x) s_i \quad (\text{mod } q) \qquad \text{Equation 1}$$

$$\lambda_i(x) = \prod_{j \in G, j \neq i} (x-j)(i-j)^{-1} \quad (\text{mod } q)$$

Then, it sets the group key $s_G$ as $s_G=f(0)$. It selects m−k points $p_1, \ldots, p_{m-k}$ in such a manner that the user IDs do not overlap one another and calculates a value $x_j=f(p_j)$ of polynomial f(x) on the points. The points and a list of the calculated values are expressed by the following message header MH:

$$MH=<(p_1, x_1), \ldots, (p_{m-k}, x_{m-k})>.$$

Finally, the group key $s_G$ and message header MH are sent to the sender terminal 210.

3. Encryption and Transmission of Information

The sender terminal 210 receives the group key $s_G$ from the dealer 230 and the encryption module 213 performs encryption of information. The message header MH received from the dealer 230 along with the group key $s_G$ is temporarily stored in the data storage 211. The encryption module 213 reads the data, which is the information to deliver, from the data storage 211 and encrypts it by using a group key $s_G$ to produce a message body MB. The message body MB is temporarily stored in the data storage 211. Then, communication means, which is not shown, reads the message header MH, the entire message body MB, and the set G of IDs in the recipient group GU from the data storage 211 and multicasts them to the recipient terminals 220 that belong to the recipient group GU.

4. Reception and Decryption of Information

The recipient terminals 220 receive the encrypted information sent from the sender terminals 210 and their decryption modules 221 decrypt the information. Each decryption module 221 first stores in the data storage 222 the encrypted information received at communication means, not shown, and obtains the threshold k from the message header MH and the set G of IDs in the recipient group GU in the data storage 222. Specifically, it calculates the threshold k (=m−h) from the number h of elements of the message header MH and the number m of elements of recipient group GU. Then, it exchanges the secret key $s_i$ delivered from dealer 230 with recipient terminals 220 of k recipients equivalent to the threshold k to reconstruct the polynomial f(x) and obtain the group key $s_G$. Then it reads the encrypted information from the data storage 222 and uses the obtained group key $s_G$ to decrypt the message body MB data.

In this way, the information encrypted and multicasted by the sender terminal 210 can be decrypted and obtained by a coalition of a number of recipient terminals 220 that satisfies the threshold k among the recipient terminals 220. The decrypted information is stored in the data storage 222 of each recipient terminal 220 and output to an output device such as a display device as required. Because encrypted data is decrypted by exchanging a secret key $s_i$ of recipient terminals 220 in this embodiment, the secret key $s_i$ is known by the recipient terminals 220 once the data is decrypted. Therefore, the use of a secret key $s_i$ delivered from the dealer 230 is limited to a single decryption or decryption of a single piece of data. It is required that a new secret key $s_i$ be delivered from the dealer 230 to recipient terminals 220 each time the data is to be decrypted or when different data is to be decrypted.

A Second Embodiment

As a second example embodiment, an information delivery system will be described in which information is encrypted and decrypted by using a public key and secret key generated by each user terminal in a peer-to-peer model including no dealer. In the second embodiment, an encryption method is implemented by the participants, a sender and recipients, defined in the first embodiment, excluding the dealer.

Figure 4:
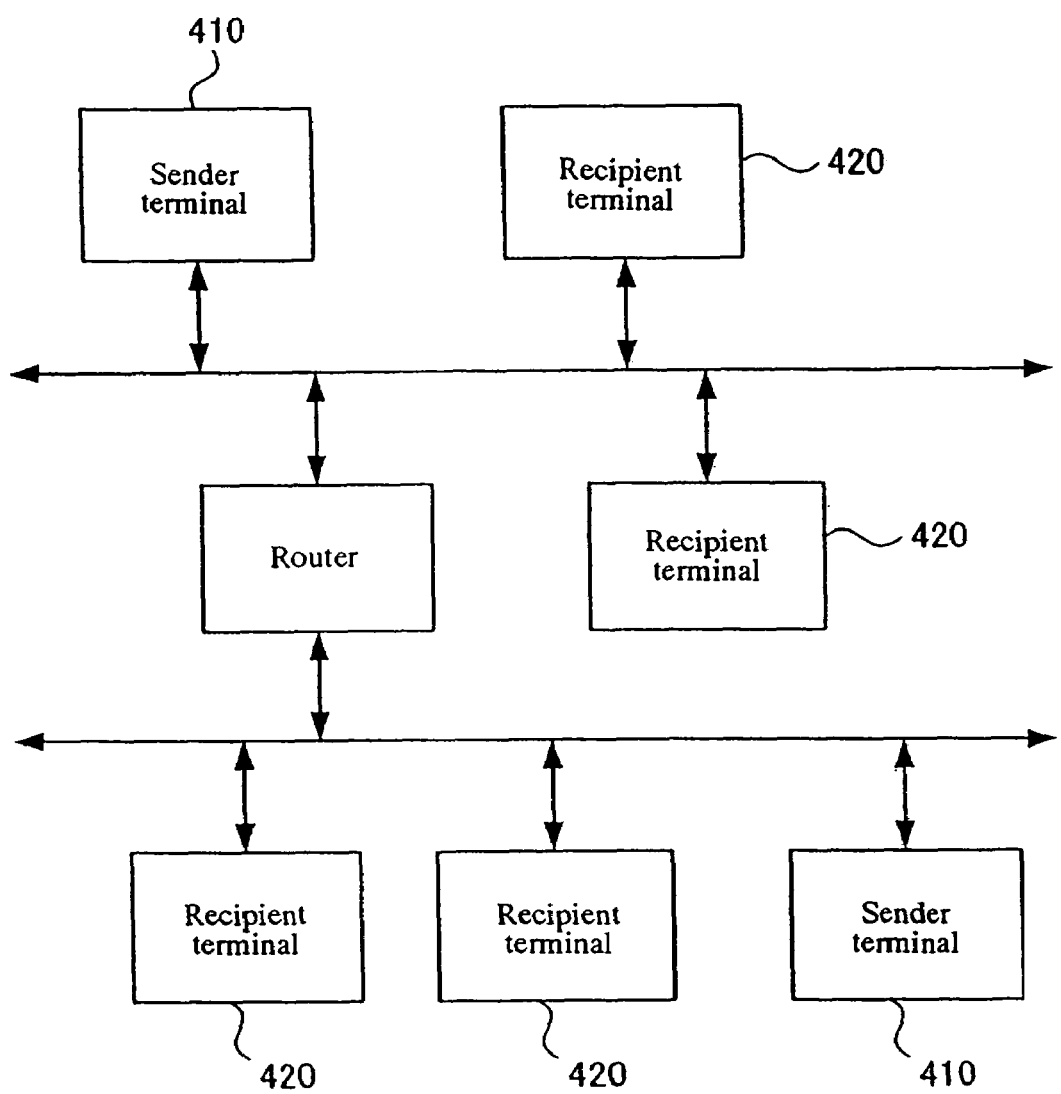
FIG. 4 shows a system configuration of an information delivery system according to a second embodiment of the present invention.

FIG. 4 shows a system configuration of an information delivery system implementing the second embodiment. Referring to FIG. 4, the information delivery system of this embodiment is a network system including sender terminals 410 used by senders defined earlier and recipient terminals 420 used by recipients defined earlier.

The sender terminals 410 and the recipient terminals 420 may be implemented by an information terminal such as personal computers, workstations, or other computer devices, or PDAs (Personal Digital Assistants) or cellular phones having network capability. The sender terminals 410 and recipient terminals 420 mean sending and receiving parties in given information delivery. Any terminal interconnected over the network can be a sender terminal 410 or recipient terminal 220. A given subset of the entire set of terminals (registered as members of the information delivery system according to the present embodiment) that can be destination of information in this embodiment is selected as a recipient group and the information is sent to that recipient group. In other words, among all the terminals constituting the information delivery system, terminals included in the subset selected as the recipient group by the sender terminal 410 are the recipient terminals 420. A recipient group may be constituted by all the terminals interconnected over the network, at the maximum.

Figure 5:
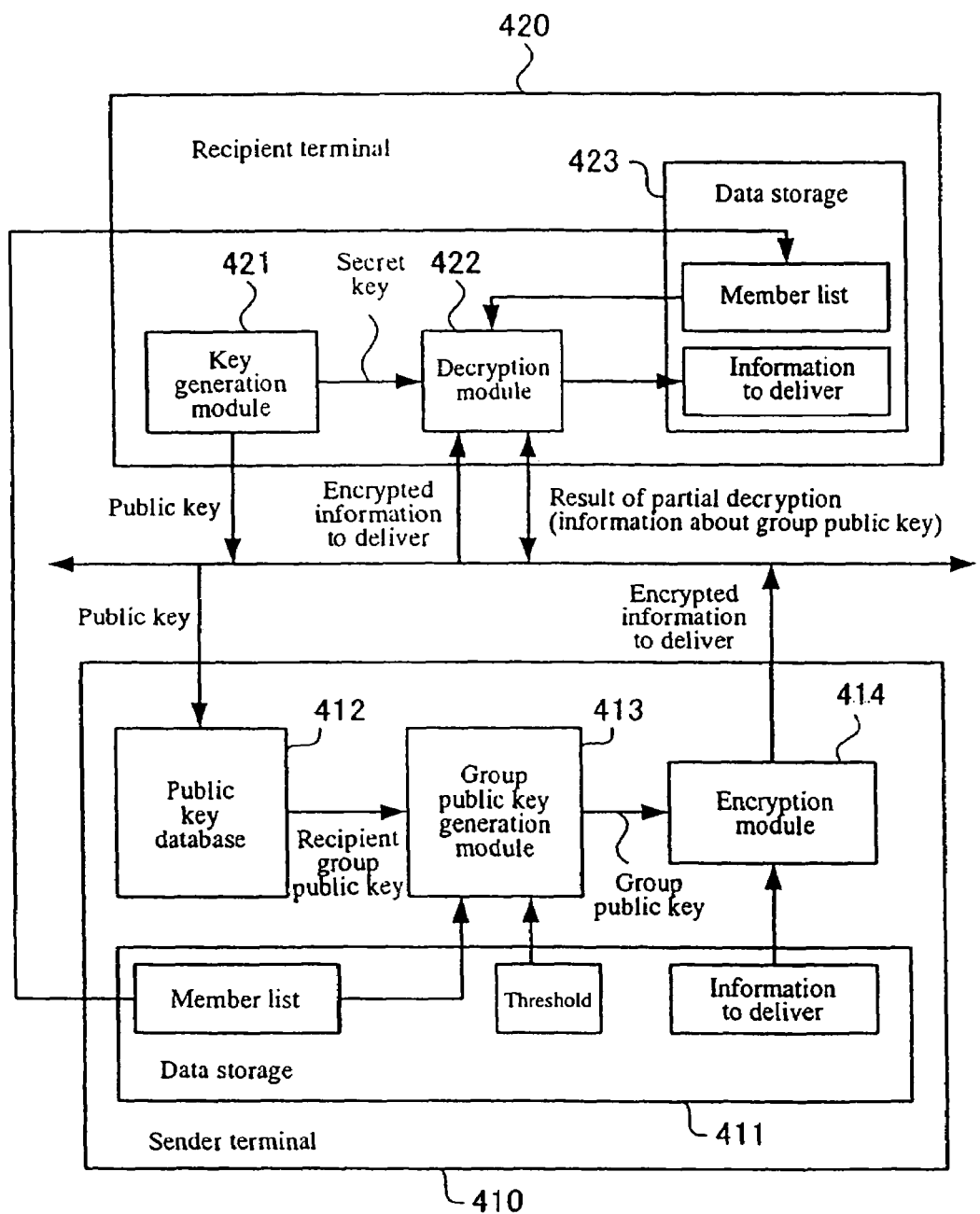
FIG. 5 shows a functional configuration of sender and recipient terminals according to the second embodiment.

FIG. 5 shows a functional configuration of a sender terminal 410 and recipient terminal 420. Referring to FIG. 5, the sender terminal 410 includes a data storage 411 storing information to be transmitted to recipient terminals 420 and a list of members of a recipient group, a public key database 412 for storing public keys of the recipient terminals 420, a group public key generation module 413 for using the public keys of recipient terminals 420 to which information is sent to generate a group public key, and an encryption module 414 for using the generated group public key to encrypt the information to deliver. The data storage 411 and public key database 412 may be memory such as RAM. The group public key generation module 413 and encryption module 414 may be implemented by a CPU controlled by a program. The program may be provided by storing and delivering it on a magnetic disk, optical disk, semiconductor memory, or other recording media, or delivering it over a network. The sender terminal 410 performs data communication with the recipient terminals 420 over the network through a communication controller and a network interface, which are not shown.

The recipient terminal 420 includes a key generation module 421 for generating a public key and secret key for itself, a decryption module 422 for using the generated secret key to decrypt a information sent from the sender terminal 410, and a data storage 423 for storing the decrypted information and other information. The key generation module 421 and decryption module 422 may be implemented by a CPU controlled by a program. The data storage 423 may be implemented by memory such as RAM. The program controlling the CPU may be provided by storing and delivering it on a magnetic disk, optical disk, semiconductor memory, or other recording media, or delivering it over a network. The recipient terminal 420 performs data communication with the sender terminal 410 over the network through a communication controller and a network interface, which are not shown. The recipient terminal 420 can output decrypted information to an output device such as a display device or audio output device, which are not shown, besides storing it in the data storage 423. While the key generation modules 421 are actually provided for all the terminals constituting the information delivery system of the this embodiment, it is described here as a component of the recipient terminal 420 for the purpose of illustration of the configuration concerning information communication.

Figure 6:
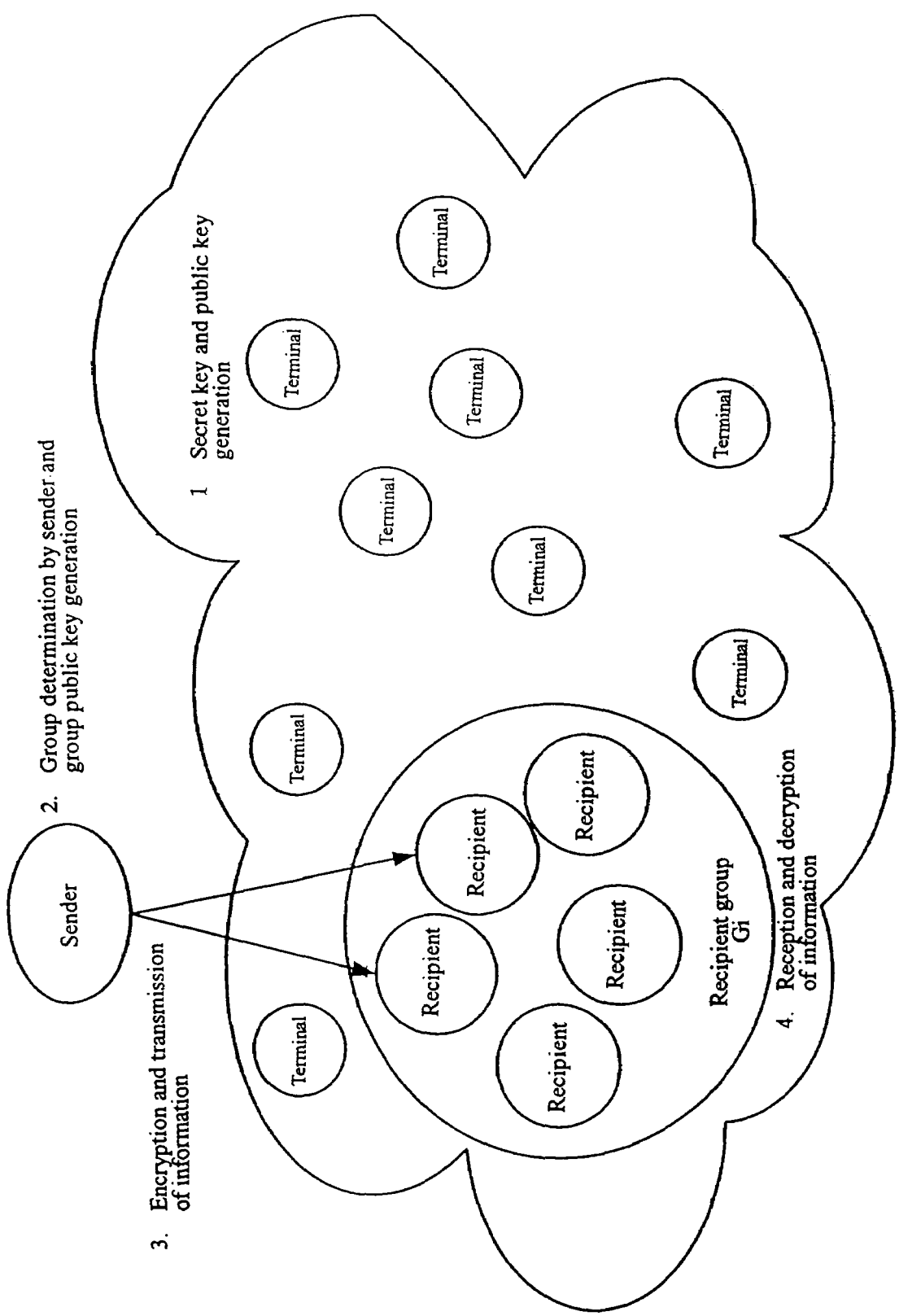
FIG. 6 shows an information delivery process in the information delivery system according to the second embodiment.

FIG. 6 illustrates a process for the information delivery system configured as described above according to the present embodiment. Referring to FIG. 6, information communication according to the present embodiment includes of four main phase: 1. Generation of secret key and public key, 2. Group determination by sender and group public key generation, 3. Encryption and transmission of information, and 4. Reception and decryption of information. These phases will be described below.

As with the first embodiment, p represents a large prime number, q represents a prime number that can divide p−1 without a remainder, and g represents an element of an order q in a finite field Zp.

1. Generation of Secret Key and Public Key

N terminals $s_i$ (where i=1, . . . , N) constituting the information delivery system according to the present embodiment generate secret and public keys by using their key generation modules 421.

Figure 7:
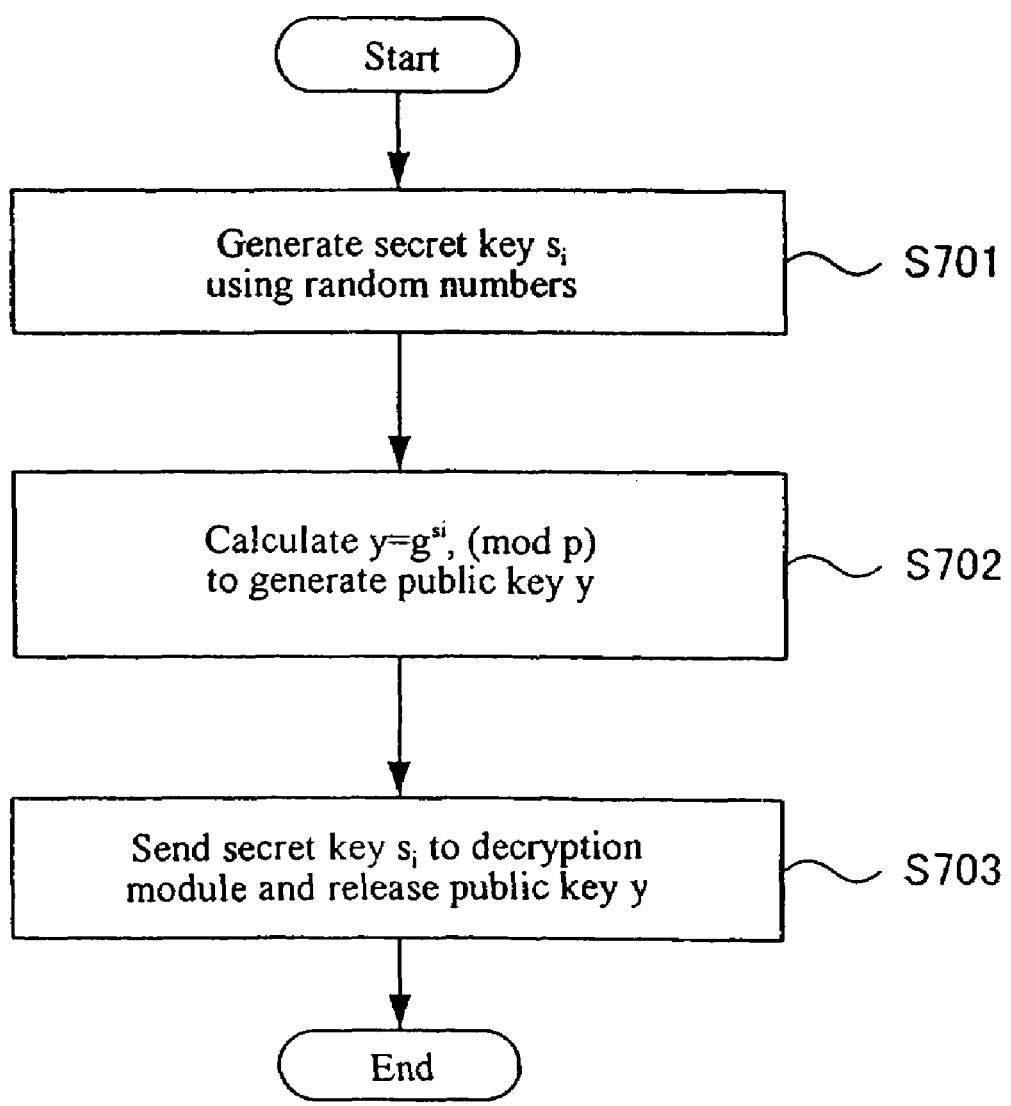
FIG. 7 shows a flowchart of a process performed by a key generation module for generating secret and public keys according to the second embodiment.

FIG. 7 shows an example of a flowchart of a process performed by a key generation module 421 for generating a secret key and public key. Referring to FIG. 7, the key generation module 421 first uses random numbers generated by a random number generator to generate a secret key $s_i$ (step 701). Then, it calculates $y = g^{s_i}$, (mod p)

to obtain a public key y (step 702). The secret key $s_i$ generated as described above is stored in the data storage 423 and the public key y is released to the public (step 703). The public key y may be released to the public by multicasting it to the N−1 other terminals in the information delivery system or may be registered in a server provided on the network for storing public keys y.

2. Group Determination by Sender and Group Public Key Generation

The sender terminal 410 selects from the universal set of the terminals constituting the network terminals to which information is sent as a recipient group $GU=\{S_{g_1}, \ldots, S_{g_m}\}$. It also sets a set of IDs of the recipient terminal 420 constituting the recipient group GU as $G=\{g_1, \ldots, g_m\}$. The number of members of the recipient group GU, that is, the recipient terminals, is m. Then a threshold k, which specifies the minimum number of members that collaborate to decrypt encrypted data, is determined, and the group public key generation module 413 generates a group public key $y_G$ for the recipient group GU.

The method for generating the group public key $y_G$ will be further described below.

Figure 8:
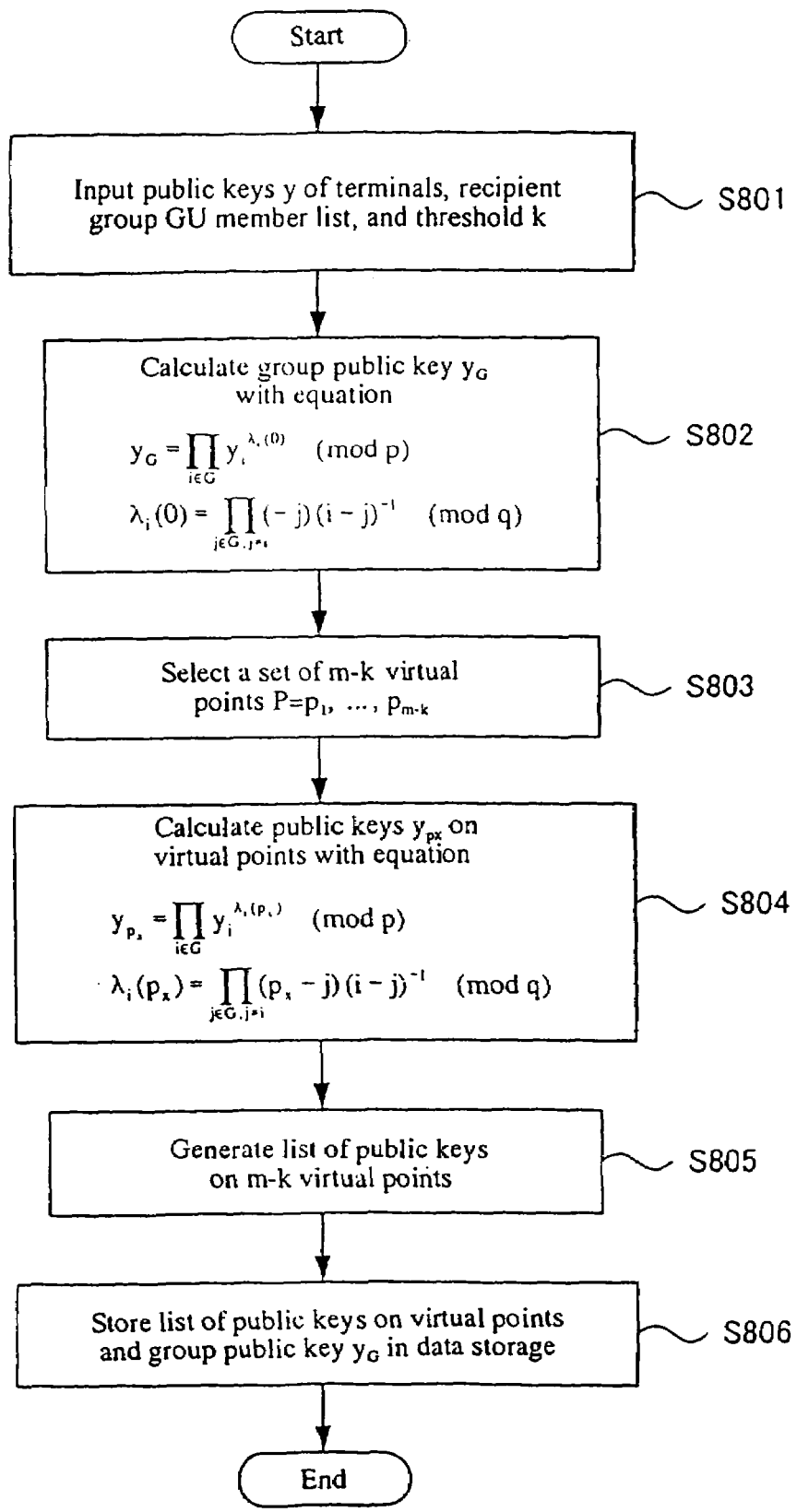
FIG. 8 shows a flowchart of a process performed by a group public key generation module of a sender terminal for generating a group public key according to the second embodiment.

FIG. 8 shows a flowchart for illustrating the process performed by the group public key generation module 413 of the sender terminal 410 for generating the group public key $y_G$.

As an initial operation, the sender terminal 410 obtains public keys y of the terminals constituting the information delivery system and stores them in the public key database 412 beforehand. It also stores a list of the members of the recipient group GU and a threshold k in the data storage 411. The list of the members of the recipient group GU is also sent to the recipient terminals 420 belonging to the recipient group GU and stored in their data storage 423. As shown in FIG. 8, the public keys y of the terminals are input in the group public key generation module 413 of the sender terminal 410 from the public key database 412 and the recipient group GU member list and a threshold k are input from the data storage 411 (step 801). Then, the group public key generation module 413 calculates the group public key $y_G$ by using the following equation 2 (step 802):

$$y_G = \prod_{i \in G} y_i^{\lambda_i(0)} \quad (\text{mod } p) \qquad \text{Equation 2}$$

$$\lambda_i(0) = \prod_{j \in G, j \neq i} (-j)(i-j)^{-1} \quad (\text{mod } q)$$

Then the group public key generation module 413 selects a set of m−k virtual points $P=p_1, \ldots, P_{m-k}$ in such a manner that the user IDs do not overlap one another (step 803) and calculates public keys $y_{px}$ on the virtual points by using the following equation 3 (step 804):

$$y_{Px} = \prod_{i \in G} y_i^{\lambda_i(P_x)} \quad (\text{mod } p) \qquad \text{Equation 3}$$

$$\lambda_i(P_x) = \prod_{j \in G, j \neq i} (P_x - j)(i - j)^{-1} \quad (\text{mod } q)$$

Then it generates a list of the public keys on the m−k virtual points (step 805) and stores them in the data storage 411 along with the group public key $y_G$ (step 806).

3. Encryption and Transmission of Information

The encryption module 414 of the sender terminal 410 performs encryption of information to deliver.

Figure 9:
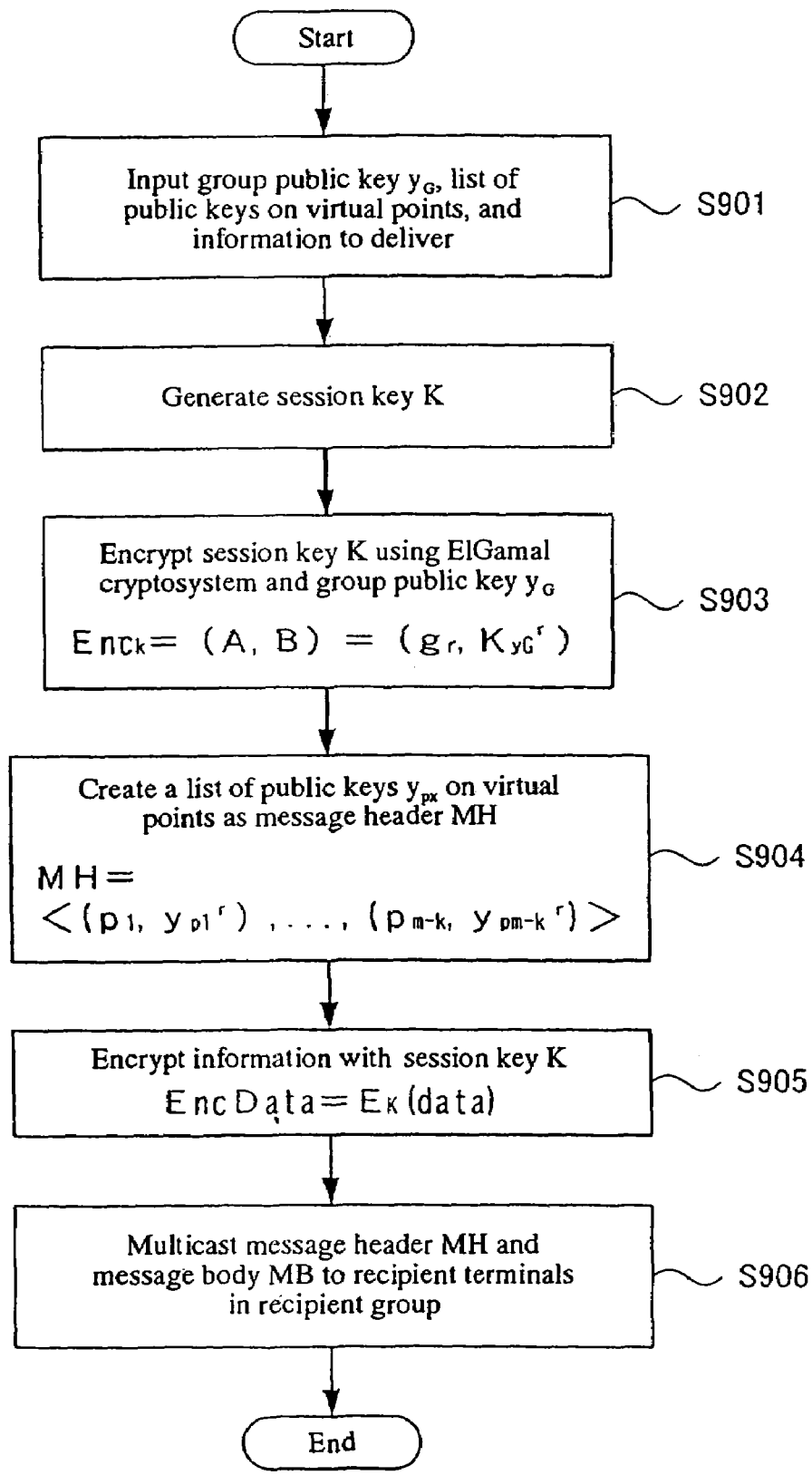
FIG. 9 shows a flowchart of a process for encrypting information to be delivered according to the second embodiment.

FIG. 9 shows a flowchart of a process for encrypting information to be delivered.

Referring to FIG. 9, inputted into the encryption module 414 from the data storage 411 are the group public key $y_G$, the list of public keys on the virtual points, and data, which is information to deliver (step 901). It then generates a session key K (step 902) and encrypts the session key K by using the group public key $y_G$ and an ElGamal cryptosystem (step 903).

$$Enc_k=(A,B)=(g_r,Ky_G^r)$$

where r is any random number.

The encryption module 414 then creates as a message header MH a list of public keys $y_{px}$ on the virtual points calculated previously (step 904).

$$MH=<(p_1, y_{p1}^r), \ldots, (p_{m-k}, y_{pm-k}^r)>$$

Then, it encrypts the transmission data by using the session key K to produce a message body MB (step 905), as follows:

$$EncData=E_k(data)$$

It then stores the message header MH and the entire message body MB generated as described above in the data storage 411. Then, communication means, which is not shown, reads the message header MH and the entire message body MB stored in the data storage 411 and multicasts them to the recipient terminals 420 in the recipient group GU (step 906).

While an ElGamal cryptosystem is used for encrypting the session key K with the group public key $y_G$, other cryptosystems in a finite field, such as an elliptic curve cryptosystem, for example, may also be used.

4. Reception and Decryption of Information

Each recipient terminal 420 receives the encrypted information sent from the sender terminal 410 and its decryption module 422 performs a process for decrypting the information.

Figure 10:
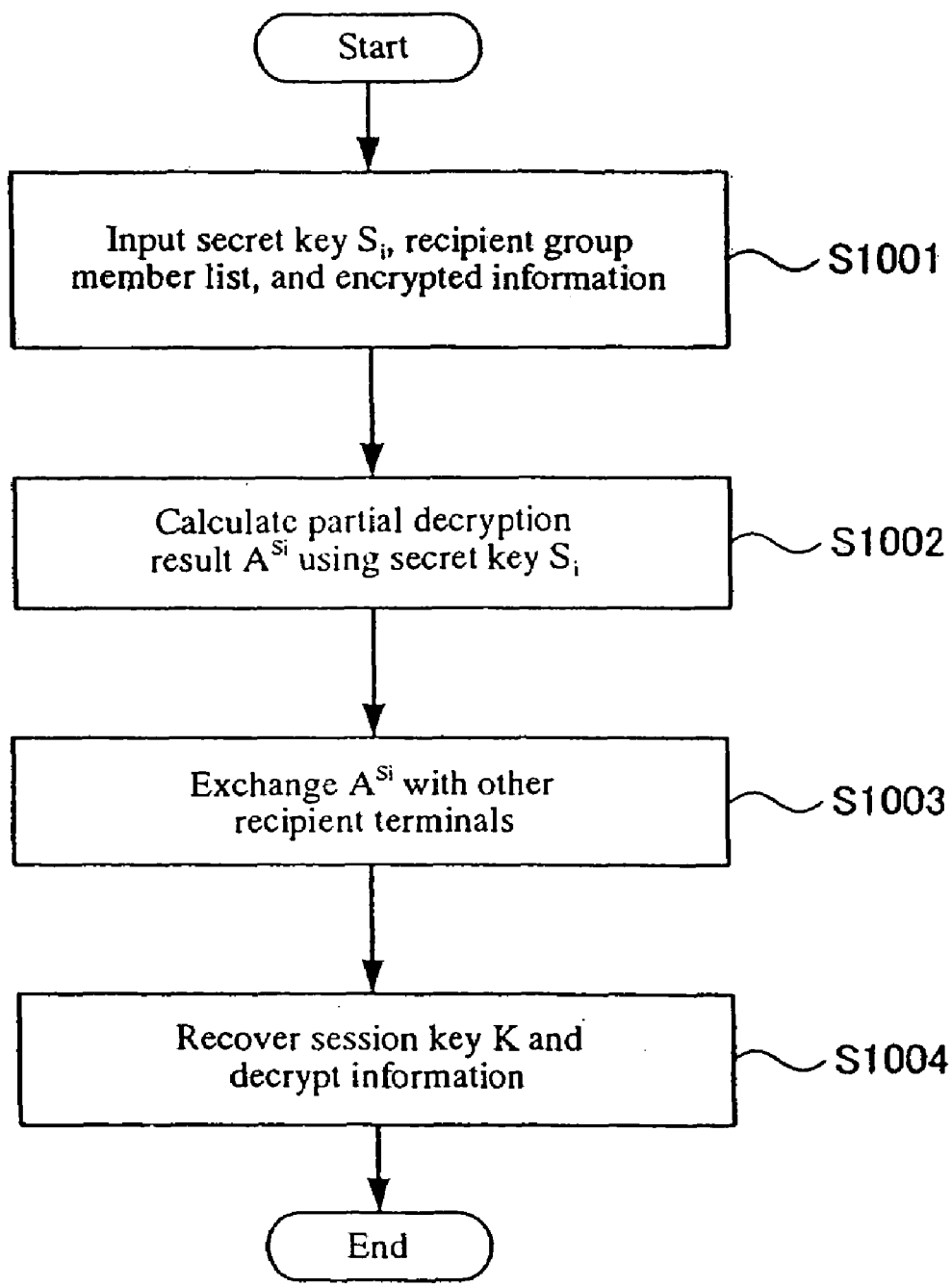
FIG. 10 shows a flowchart of a process for decrypting received information according to the second embodiment.

FIG. 10 shows a flowchart of the process for decrypting the received information.

Referring to FIG. 10, first input into the decryption module 422 are the list of the members of the recipient group GU which is received previously from the sender terminal 410 and the secret key $s_i$ of that recipient terminal 420 stored in the data storage 423. Also, encryption information delivered from the sender terminal 410 is also input into the decryption module 422 (step 1001).

Then, the decryption module 422 uses the secret key $s_i$ to calculate partial decryption information $A^{Si}$, which is the result of partial decryption, and stores it in the data storage 423 (step 1002). This is information concerning the group public key $y_G$ that can recover the session key K, as will be described later. It then checks the message header MH of the encrypted information received from the sender terminal 410 to see the threshold k and exchanges the partial decryption information $A^{Si}$ calculated previously with k−1 recipients terminals 420 by referencing the member list of the recipient group GU (step 1003). When the partial decryption information $A^{Si}$ is obtained from the k−1 recipient terminals 420 (including this recipient terminal 420), the following equation 4 can be used to obtain decryption information $A^{f(0)}$ from that partial decryption information $A^{Si}$ and the partial decryption information $A^{Si}$ of this recipient terminal 420 which is stored in the data storage 423.

$$A^{f(0)} = \prod_{i \in P} y_i^{\lambda_i(0)} \prod_{i \in G'} A^{S_i \lambda_i(0)} \pmod{p} \quad \text{Equation 4}$$

-continued
$$\lambda_i(0) = \prod_{j \in G' \cup P, j \neq 1} (-j)(i-j)^{-1} \pmod{q}$$

Because $y_G = g^{f(0)}$, the calculated decryption information $A^{f(0)}$ and the following equation 5 can be used to recover the session key K.

$$\frac{B}{A^{f(0)}} = \frac{Kg^{f(0)r}}{g^{rf(0)}} = K \pmod{p} \quad \text{Equation 5}$$

Finally, the recovered session key K is used to recover the message body MB data (step 1004).

In this way, the information encrypted and multicasted can be decrypted and obtained by a coalition of a number of recipients terminals 420 that satisfies the threshold k among the recipient terminals 420. In other words, an information delivery system can be provided according to this embodiment in which a plurality of recipient terminals 420 collaborate to decrypt encrypted information without a dealer for generating and delivering keys. The decrypted information is stored in the data storage 423 of each recipient terminal 420 and output to an output device such as a display device as required. As with the first embodiment, by setting a threshold k to a value equal to the number of the recipients terminals 420 belonging to a recipient group GU, information delivery can be provided in which data can be decrypted only by a coalition of all the recipient terminals 420 in the recipient group GU.

Because the present embodiment requires no dealer that manages keys used for information delivery, there is no risk of leakage of information about keys which could otherwise occur due to an attack against such a dealer or eavesdropping of a secret key during transmission.

Furthermore, any of terminals interconnected over a network can be a sender terminal 410 and can select a subset of any of the other terminals as a recipient group GU and send information to that recipient group GU. Therefore, the embodiment can be advantageously used in a large network in which it is difficult to keep track of changes in the total number of users. While in the embodiment the sender terminal 410, after generating the list of the members of the recipient group GU, stores the list in its own data storage 411 and also sends it to the recipient terminals 420 in the recipient group GU prior to sending information to deliver in order to synchronize the member list in the sender terminal 410 and the recipient terminals 420 in the recipient group GU, they can be synchronized in another way such as sending the list along with the information to deliver.

While for simplicity the embodiments have been described in which IDs and keys (secret and public keys) are set for terminals constituting a network system, IDs and keys can be set for users of terminals. In that case, a user can input (or generate) his or her ID and key in any of the terminals which he or she uses to cause the terminal to function as a sender terminal 410 or a recipient terminal 420 as described above. As a result, a network system irrespective of specific hardware is implemented.

Examples to which an embodiment of the present invention is applied will be described below. While either the first or second embodiment can be applied to the following embodiment depending on the way in which services are provided, the second embodiment is applied to the examples.

EXAMPLE 1

An example in which the embodiment is applied to a system for delivering contents over the Internet will be described. Today, content delivery systems, such as Gnutella, that use a peer-to-peer model are built on the Internet. The encryption method according to the second embodiment can be applied to that type of content delivery systems to implement a secure system in which transmissions are not eavesdropped by a party other than their intended recipients.

Figure 11:
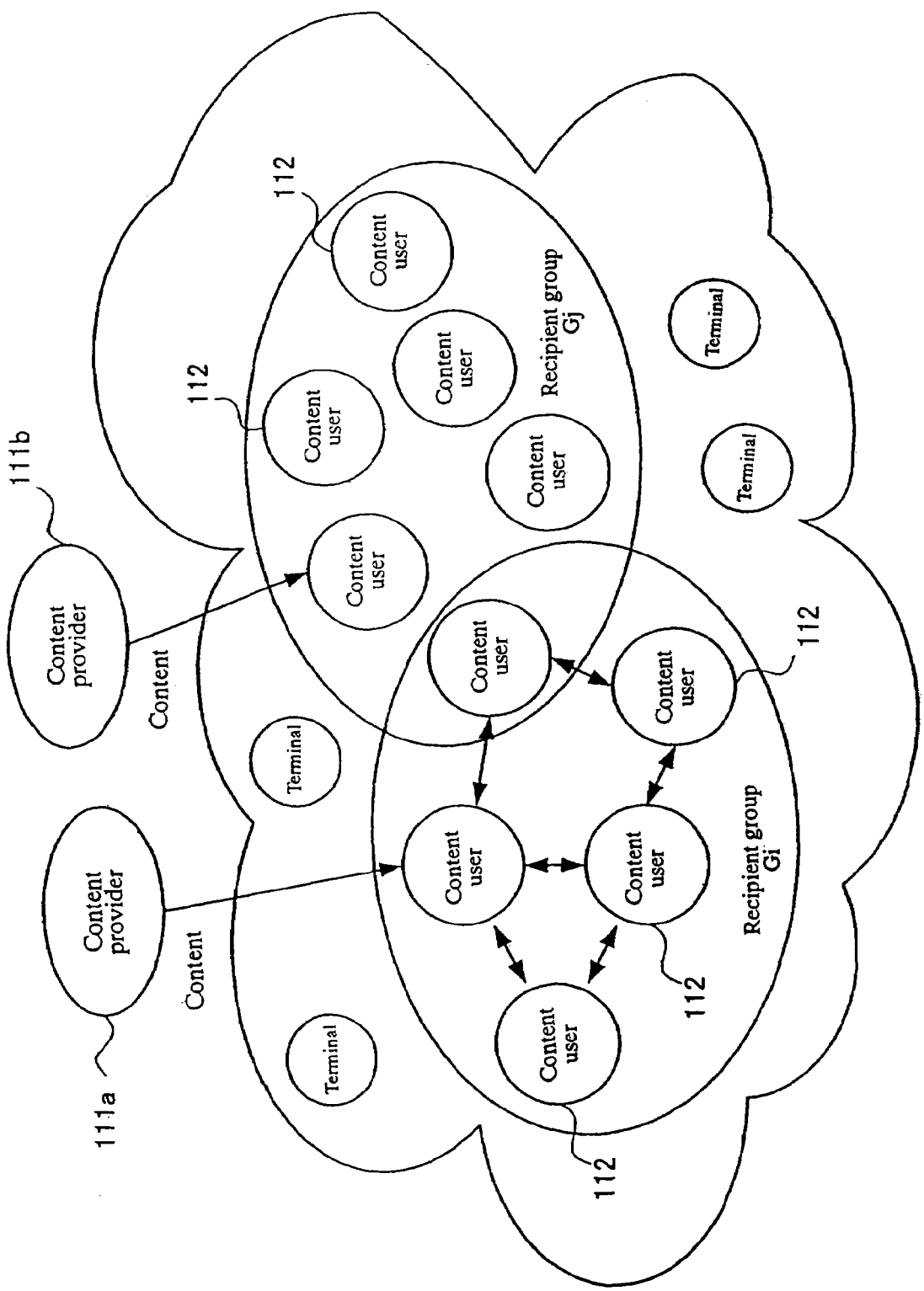
FIG. 11 shows a configuration of a content delivery system to which the encryption method of the second embodiment is applied.

FIG. 11 shows a configuration of a content delivery system to which the encryption method according to the second embodiment is applied. In FIG. 11, a content provider 111 (while content providers 111a and 111b are shown in FIG. 11, they will be genetically indicated as "content provider 111" unless distinction between them is required) corresponds to a sender terminal 410 in the second embodiment and content users 112 correspond to recipient terminals 420.

The content provider 111 defines a subset of users (terminals) of the system as a recipient group and constructs a group encryption key that only the members of that recipient group can decrypt. Because the group encryption key can be constructed from public keys of content users 112, no trusted organization (dealer) such as a TTP is required.

The content users 112 generate their own secret keys and release their corresponding public keys to the public. As described earlier, the public keys are used to generate a group encryption key, the users need only release their public key to receive contents through this content delivery system. In other words, any user of the system can become a content user 112 simply by connecting to the network and releasing his or her public key.

The content provider 111 can decide any subset of the users who released their public keys as a recipient group to which it delivers contents. Therefore, as shown in FIG. 11, the members of a recipient group to which content provider 111a delivers contents may differ from the members of a recipient group to which content provider 111b provides contents. In addition, content provider 111a can change the members of the recipient group from the first to the second content delivery.

A typical scenario in which the content delivery system is used may be as follows.

(1) The content provider 111 provides its Web site and solicits for subscription.
(2) A user accesses the network and registers on the site of the content provider 111 to become a content user 112. The minimum requirements for the user to register is to generate his or her secret key and registers its corresponding public key on a member list on the Web site of the content provider 111.
(3) The content provider 111 generates a group encryption key based on public keys registered on the member list, encrypts a content with the group key, and multicasts it.
(4) The content user 112 references the member list and collaborates with other members of the group to decrypt and use it.

If a registration fee is required or services are provided for pay, the payment of these fees may be added to the registration requirements in step 2 described above, for example, in this scenario.

While contents are delivered to all the content users 112 registered as a member of the system in this scenario, contents may be delivered to some of the content users 112 registered on the member list at the server, as described above. For example, different contents (contents plus samples, for example) can be delivered depending on fees paid.

EXAMPLE 2

According to the embodiment, delivered information can be decrypted only by a coalition of members of a recipient group that is equal to a threshold k specified by $1 \pounds k \pounds m$, where m is the size (the number of recipient terminals 420) of the recipient group. By taking full advantage of this, an application can be provided in which a decision agreed by a certain number of members is transmitted over a network.

Figure 12:
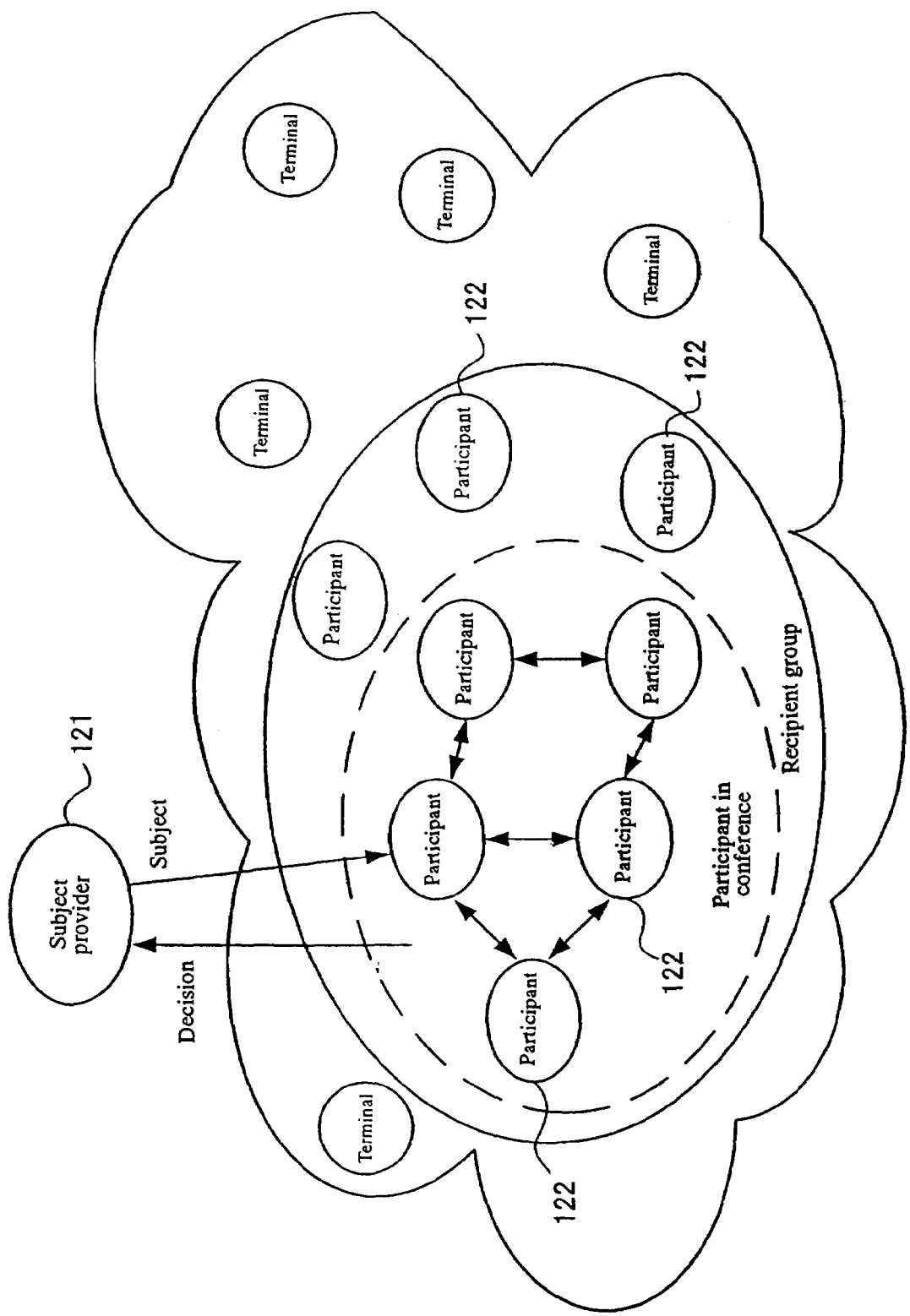
FIG. 12 shows a configuration of a conference system to which the encryption method of the second embodiment is applied.

FIG. 12 shows a configuration of the conference system to which the encryption method of the second embodiment is applied.

In FIG. 12, a subject provider 121 corresponds to a sender terminal 410 in the second embodiment and participants 122 in the conference correspond to recipient terminals 420.

If a threshold k is set to the number (a majority, for example) of participants 122 that is required for a decision and a subject is sent in the system as shown in FIG. 12, the subject cannot be read unless k participants 122 gather on the network. On the other hand, if the subject is decided on, it means that the subject was able to be read, that is, k participants 122 gathered and decrypted the subject. Accordingly, the decision was made by agreement among k or more participants 122 and therefore can be considered valid.

A typical scenario using this conference system may be as follows.

(1) A subject provider 121 first creates a group key for participants 122, sets a threshold k to a quorum, encrypts a subject, which is information to deliver, with the group key, and multicasts it.
(2) More than or equal to k number of participants 122 collaborate to decrypt the delivered subject and discuss the subject.
(3) A reply to (decision about) the subject is returned to the subject provider 121. This means that the decision is the result of the discussion among more than or equal to k participants 122.

While in this example the subject provider 121 receives the decision, a decision receiver may be provided besides a subject provider 121 and a decision made by participants 122 may be sent to the decision receiver.

EXAMPLE 3

According to the embodiment, a single recipient terminal 420 alone cannot decrypt encrypted information delivered. This can be used to provide a system for accounting or access counting (metering).

Figure 13:
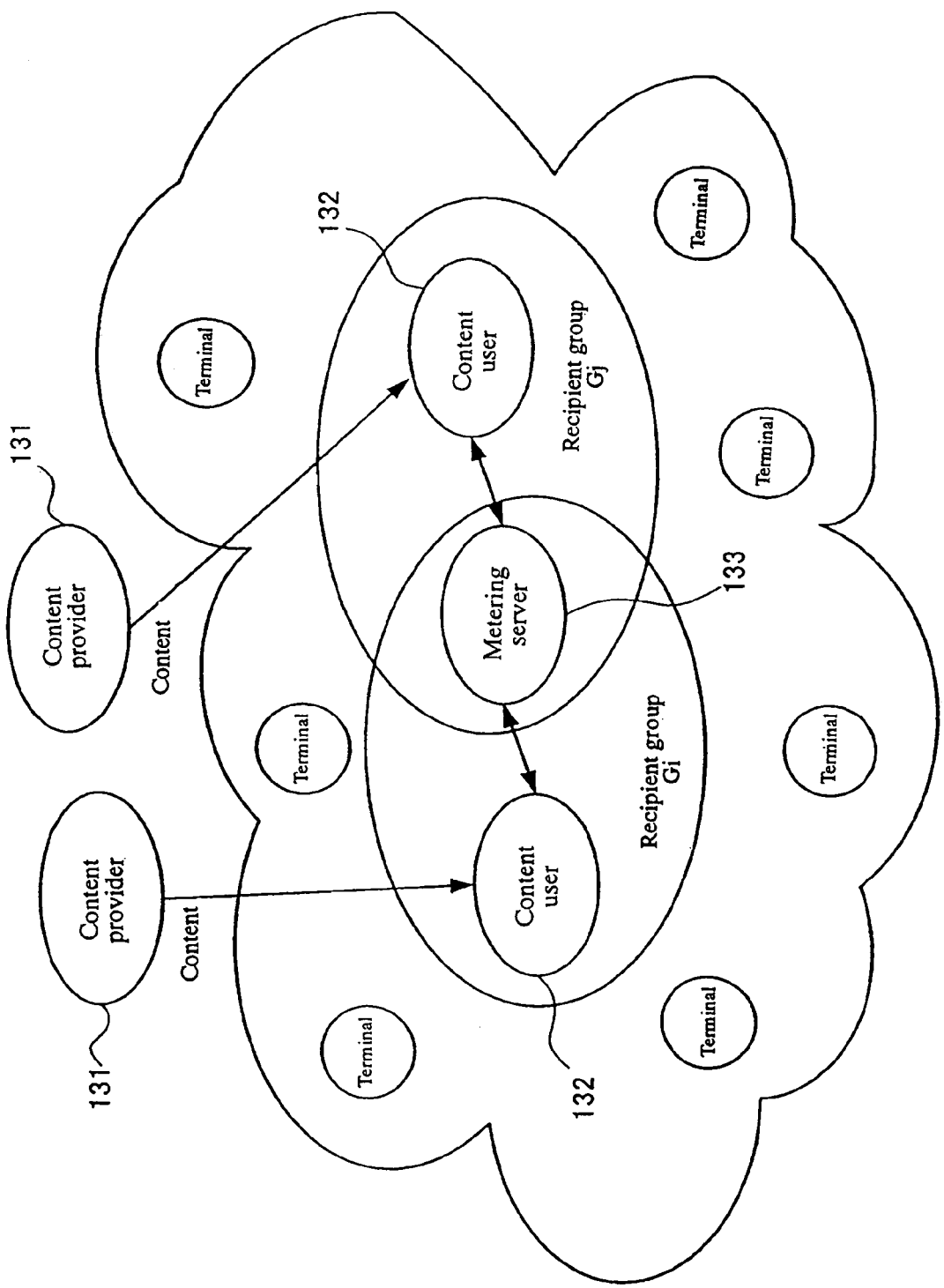
FIG. 13 shows a configuration of a metering system to which the encryption method of the second embodiment is applied.

FIG. 13 shows a configuration of a metering system to which the encryption method according to the second embodiment is applied. A content provider 131 in FIG. 13 corresponds to a sender terminal 410 in the second embodiment and a content user 132 corresponds to a recipient terminal 420. A metering server 133 is a server that is provided for decrypting an encrypted content in collaboration with recipient terminals 420 and acts as a recipient.

In the system shown in FIG. 13, the assumption is that the size (the number of recipient terminals 420) of a recipient group is 2, and one of the recipients is a content user 132 and the other is a metering server 133. If a threshold value of 2 is set and encrypted information is delivered, the content user 132 accesses the metering server 133 to obtain information required for recovering the session key for decrypting the information. When the content user 132 accesses the metering server 133, the metering server 133 can perform processes such as accounting or access counting.

A typical scenario in which the metering system is used as an accounting system may be as follows.

(1) A content provider 131 creates a group key from public keys of a content user 132 and a metering server 133, encrypts a content with the group key, and sends it to the content user 132.

(2) The content user 132 accesses the metering server 133 and collaborates with the metering server 133 to decrypt and obtain the content. Here, when the content user 132 accesses the metering server 133, the metering server 133 performs accounting.

EXAMPLE 4

According to the present embodiment, encrypted information cannot be decrypted unless a plurality of recipient terminals 420 collaborate. By taking advantage of this, secrecy of information can be distributed.

Figure 14:
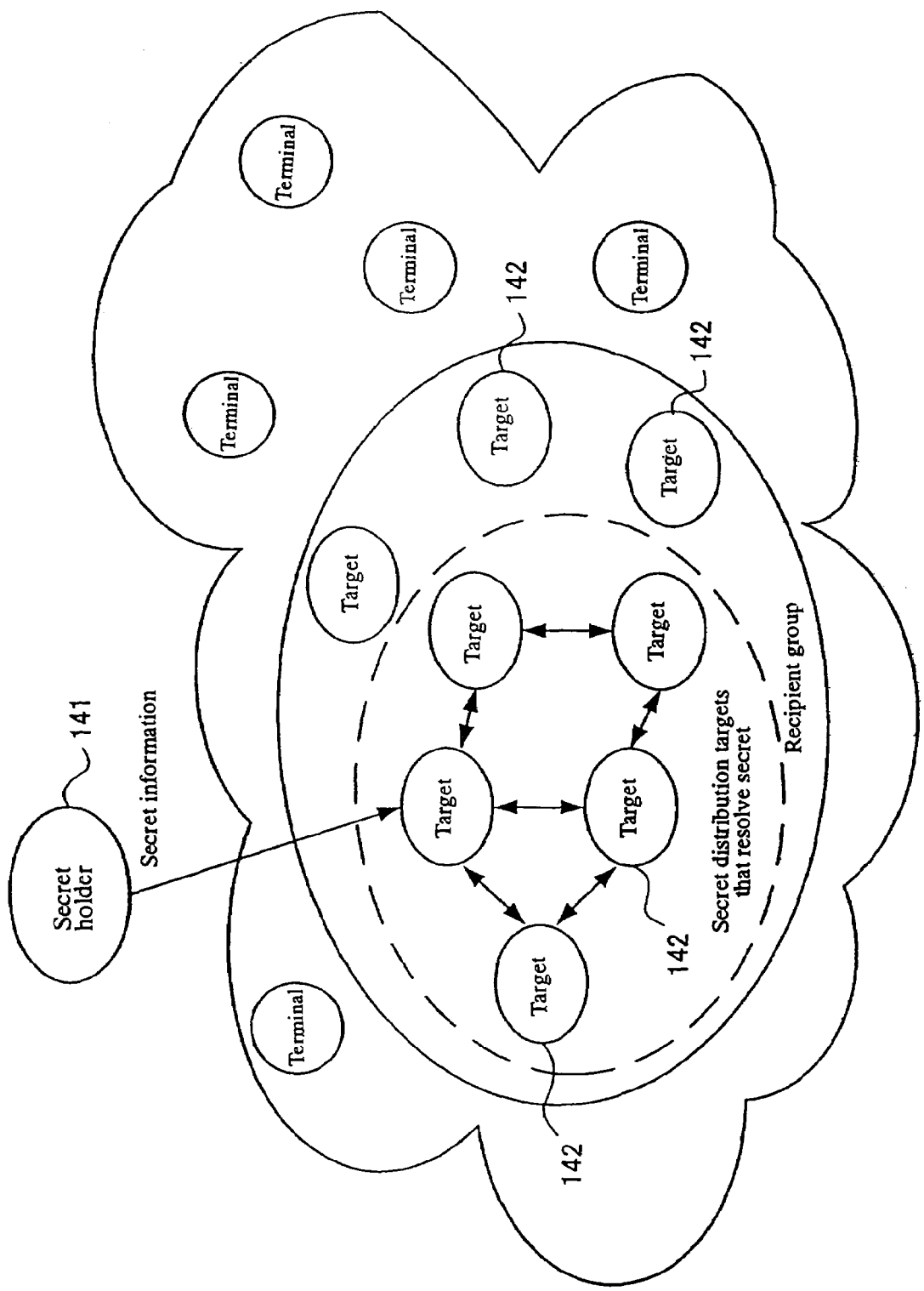
FIG. 14 shows an example of a secret distribution system to which the encryption method of the second embodiment is applied.

FIG. 14 shows a configuration of a secret distribution system to which the encryption method of the second embodiment is applied.

A secret holder 141 in FIG. 14 corresponds to a sender terminal 410 in the second embodiment and a secret distribution target (labeled with "target" in FIG. 14) 142 corresponds to a recipient terminal 420.

In the system as shown in FIG. 14, encrypted information delivered to secret distribution targets 142 in a recipient group is stored in them in a distributed manner. That is, a threshold k number of secret distribution targets 142 among the secret distribution targets 142 in the recipient group can gather to resolve the secrecy of the information.

A typical scenario in which this secret distribution system is used may be as follows:

(1) A secret holder 141 creates a group key from public keys of secret distribution targets 142, encrypts secret information with the group key, and distributes it. It also sets a threshold k as the minimum number of recipients that is required for resolving secrecy of the information.

(2) If the secrecy of the delivered information is required to be resolved, k holders that have the distributed value gather to resolve the secret and obtain the information.

EXAMPLE 5

According to the present embodiment, a plurality of recipient terminal 420 can collaborate to obtain encrypted information. By taking advantage of this, a system can be implemented for granting rights to obtain services or participate events provided over a network on condition that a plurality of users constitute a group.

For example, a game site operator (corresponding to a sender terminal 410 in the second embodiment) may provide a network game event in which people can participate in groups (parties), each including of k people. The game site operator delivers to game participants (corresponding to recipient terminals 420 in the second embodiment) an item with which a group of k people can collaborate to recover information representing a right to participate the event. The item is encrypted with a group key, which is generated from public keys of game participants. The k participants in the group may recover the information based on the obtained item and obtain the participation right to participate the event.

Advantage of the Invention

As described above, the present invention provides an encryption method and a decryption method in which terminals belonging to a subset selected as a recipient group can collaborate to decrypt encrypted information. The present invention also provides secure multicasting data delivery that uses the encryption method and decryption method.

Given this disclosure alternative equivalent embodiments will become apparent to those skilled in the art. These embodiments are also within the contemplation of the inventors. It is understood that other embodiments are possible that incorporate the principles of the invention and that the above disclosure is merely illustrative of such principles and is not intended to be limiting in any respect. Thus, the present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means, or computer program, in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. For example other mesh resampling operators and/or operations may be implemented using the concepts of this invention. The described embodiments ought to be construed to be merely illustrative of some of the more prominent features and applications of the invention. Other beneficial results can be realized by applying the disclosed invention in a different manner or modifying the invention in ways known to those familiar with the art Given this disclosure alternative equivalent embodiments will become apparent to those skilled in the art. It is understood that other embodiments are possible that incorporate the principles of the invention and that the above disclosure is merely illustrative of such principles and is not intended to be limiting in any respect. These embodiments are also within the contemplation of the inventors.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means, or computer program, in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A conference system comprising a subject provider terminal for providing a subject to be discussed and participant terminals for obtaining said subject provided from said subject provider over a network, for providing secure multicasting data delivery, and for making a decision about said subject, wherein;
   said subject provider terminal encrypts said subject to produce encrypted subject that can be decrypted by collaboration among a number of participant terminals in said participant terminals that is equal to a predetermined threshold, and delivers said encrypted subject to said participant terminals over said network;
   said participant terminals being in a subset selected as a participant group for collaboration to decrypt encrypted data, and to receive said encrypted data sent from said subject provider terminal and exchange partial information unique to each of the participant terminals among a number of participant terminals equal to said threshold to produce decryption information required for decrypting said encrypted data, said partial information being one of: a secret key of each recipient terminal, and decryption information produced by processing encrypted data with the secret key when a public key cryptosystem is used, wherein:
   a sender terminal sets the predetermined threshold indicating a number of recipient terminals required to collaborate for decrypting said encrypted subject and sends said threshold to said recipient terminals along with said encrypted subject;
   said number of recipient terminals being equal to said threshold, exchange said partial information, and
   an encryption module of said sender terminal constructs a polynomial passing through points having values of said public keys of said recipient terminals and uses a group key as a constant term of said polynomial.

2. A computer program product comprising a computer usable medium having computer readable program code means embodied therein for causing the conferencing system functions of claim 1.

* * * * *